(12) United States Patent
Hamilton, II et al.

(10) Patent No.: US 10,127,143 B2
(45) Date of Patent: Nov. 13, 2018

(54) GENERATING AN EVOLVING SET OF TEST CASES

(71) Applicant: International Business Machines Corporation, Armonk, NY (US)

(72) Inventors: Rick A. Hamilton, II, Charlottesville, VA (US); Jorge Alonso Hernandez Nevarez, Jalisco (MX); Agueda Martinez Hernandez Magro, Zapopan (MX); Jose Roberto Mosqueda Mejia, Michoacan (MX)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 14/523,343

(22) Filed: Oct. 24, 2014

(65) Prior Publication Data
US 2016/0117239 A1   Apr. 28, 2016

(51) Int. Cl.
G06F 9/44 (2018.01)
G06F 11/36 (2006.01)

(52) U.S. Cl.
CPC ...... *G06F 11/3684* (2013.01); *G06F 11/3664* (2013.01); *G06F 11/3668* (2013.01)

(58) Field of Classification Search
CPC ............. G06F 11/3664; G06F 11/3668; G06F 11/3684
See application file for complete search history.

(56) References Cited

U.S. PATENT DOCUMENTS

| 7,506,312 B1* | 3/2009 | Girolami-Rose | G06F 8/71 717/101 |
| 8,266,592 B2 | 9/2012 | Beto et al. | |
| 9,489,290 B1* | 11/2016 | Boissy | G06F 11/3688 |
| 2003/0204836 A1* | 10/2003 | Srivastava | G06F 11/3676 717/124 |

(Continued)

OTHER PUBLICATIONS

Yihan Li and Chao Liu, Effective Fault Localization Using Weighted Test Cases, Journal of Software, vol. 9, No. 8, Aug. 2014, retrieved online on Jun. 1, 2018, pp. 2112-2119. Retrieved from the Internet: <URL: https://pdfs.semanticscholar.org/108d/9b36d0c529d9e3b4aa0ff5f9b69390a08815.pdf>. (Year: 2014).*

(Continued)

*Primary Examiner* — Hanh Thi-Minh Bui
(74) *Attorney, Agent, or Firm* — Scully, Scott, Murphy & Presser, P.C.; Scott Dobson, Esq.

(57) ABSTRACT

A method, system and computer program product for defining an evolving set of test cases for testing software applications. In an embodiment, the method comprises identifying a set of criteria for the test cases; assigning a weight to each of the criteria; and for each of a multitude of test cases, assigning a value to each of the criteria, and determining a criteria score for the test case based on the values assigned to the criteria for the test case and the weights assigned to the criteria. Each of the test cases is assigned to one of a plurality of groups based on the criteria scores. Each of the groups of test cases is associated with one of a plurality of testing procedures, and one of those procedures is selected (Continued)

to test a software application using the group of test cases associated with that selected testing procedure.

17 Claims, 7 Drawing Sheets

(56) References Cited

U.S. PATENT DOCUMENTS

| | | | |
|---|---|---|---|
| 2009/0265681 A1* | 10/2009 | Beto | G06F 11/3688 717/100 |
| 2009/0282071 A1 | 11/2009 | Roden | |
| 2011/0016452 A1 | 1/2011 | Gorthi et al. | |
| 2011/0161936 A1 | 6/2011 | Huang et al. | |
| 2012/0036085 A1* | 2/2012 | Srivastava | G06Q 10/067 705/348 |
| 2012/0042302 A1* | 2/2012 | Sikandar | G06F 11/3688 717/125 |
| 2013/0111267 A1 | 5/2013 | Beryoza et al. | |
| 2013/0159774 A1* | 6/2013 | Budnik | G06F 11/3688 714/33 |
| 2014/0196011 A1 | 7/2014 | Bostick et al. | |

OTHER PUBLICATIONS

Mehdi Mirzaaghaei, Automatic Test Suite Evolution, ACM, 2011, retrieved online on Jun. 1, 2018, pp. 396-399. Retrieved from the Internet: <URL: http://delivery.acm.org/10.1145/2030000/2025172/p396-rnirzaaghaei.pdf?>. (Year: 2011).*

IBM et al., "Method for Optimizing Automated Regression Testing", IP.com, IPCOM000187394D, Sep. 3, 2009, pp. 1-7.

* cited by examiner

| Criteria | Values | | | Values Justification |
|---|---|---|---|---|
| | Regression | << Tends to >> | Automation | |
| C1 - Requirement priority | 3 | 2 | 1 | High priority requirements are candidates for regression but may not be for automation |
| C2 - Core Function | 3 | 2 | 1 | Core functions are candidates for regression but may not be for automation |
| C3 - Defect Rate per Component | 3 | 2 | 1 | Test cases for components with high defect rate are good candidates for regression but not for automation |
| C4 - Change In Code | 3 | 2 | 1 | Test cases for components with several changes are good candidates for regression but not for automation |
| C5 - Perceived Complexity | 3 | 2 | 1 | Test cases for complex components are good candidates for regression but not for automation |
| C6 - Defect Injection rate of Developer | 3 | 2 | 1 | Test cases for components developed by someone with high defect injection are good candidates for regression but not for automation |
| C7 - Execution Time | 3 | 2 | 1 | Test cases that require too much execution time are good candidates for automation but may not be for regression |
| C8 - Execution Environment | 3 | 2 | 1 | Test cases that are executed on several environments are good candidates for automation but may not be for regression |
| C9 - Test Data | 3 | 2 | 1 | Test cases that required several input data are good candidates for automation but may not be for regression |
| C10 - Test case Execution Results | 3 | 2 | 1 | Test cases that fail constantly are good candidates for regression but not be for automation |
| C11 - Sentiment Analysis | 3 | 2 | 1 | Test cases for functionality that is perceived as low quality by the client are good candidates for regression but may not be for automation |

FIG. 4

| Criteria | Initial suggested Weight per criteria |
|---|---|
| C1 - Requirement priority | 3 |
| C2 - Core Function | 3 |
| C3 - Defect Rate per Component | 3 |
| C4 - Changes In Code | 2 |
| C5 - Perceived Complexity | 2 |
| C6 - Defect Injection rate of Developer | 2 |
| C7 - Execution Time | 2 |
| C8 - Execution Environment | 2 |
| C9 - Test Data | 2 |
| C10 - Test case Execution Results | 3 |
| C11 - Sentiment Analysis | 3 |

FIG. 5

GENERATING AN EVOLVING SET OF TEST CASES

BACKGROUND

This invention generally relates to testing computer applications, and more specifically, to selecting test cases for such testing.

When a software application is upgraded, the application may be tested to determine if the upgrade introduces errors and/or bugs in the application. These new errors are known as regressions, and thus testing for the errors is referred to as regression testing.

This testing may include the design, development, and execution of a number of test cases. Each test case generally targets a specific element of functionality or individual interface of a software module, and includes a number of test conditions, a test script to be executed to test the conditions, and the expected result for each major step in the script.

The use of automated testing provides for more complete testing of software modules as well as more efficient regression testing of the software as changes to the modules are implemented.

Various test cases utilized in regression testing may be collected into test suites. For example, one test suite may be created to include all test scripts for a specific software module, and another created for a particular element of functionality across all modules.

Thousands of test cases may be developed for an application. Executing the entire system of test cases developed during software system testing can become expensive and time consuming. Accordingly, often not all the test cases are selected for the testing. Typically, for a large and complex system comprising thousands of test cases, the software test engineers intuitively select regression tests based on their experience and knowledge on program change specifications that need to be re-executed.

As the software development methodologies evolve into more dynamic and iterative ways of delivering code, the need for effective testing has become more and more critical. It is well known that automating a set of regression test cases is an efficient bug catching technique that allows testers to spot new defects introduced by new code in functional and non-functional areas (enhancements, fixes, configuration changes, etc.) and as well as reuse the automated scripts created for this testing purpose in different upcoming releases.

Test managers constantly circumvent the "Coverage vs. Time & Available Resources" constraints in their projects as it is not feasible to have 100% test coverage and neither automate and maintain up to date a huge number of test scripts.

As thousands of lines of code are persistently being introduced to the different modules of programs, the test team needs to effectively identify what test cases are best candidates for regression test phase and which ones of that regression universe are automation worthy.

SUMMARY

Embodiments of the invention provide a method, system and computer program product for defining an evolving set of test cases for testing software applications using analytics. In an embodiment, the method comprises identifying a set of criteria for the test cases; assigning a weight to each of the criteria; and for each of a multitude of specified test cases, assigning a value to each of the criteria, and determining a criteria score for the each test case based on the values assigned to the criteria for the each test case and the weights assigned to the criteria. Each of the test cases is assigned to one of a plurality of groups based on the criteria scores for the test cases. Each of the groups of test cases is associated with one of a plurality of testing procedures, and one of those procedures is selected to test a given software application using the group of test cases associated with that selected testing procedures.

In an embodiment, the set of criteria includes a defined social media criteria.

In one embodiment, the assigning a value to each of the criteria includes identifying specified comments in a defined social media platform about the software application, analyzing the identified specified comments, and using said analyzing to determine the value assigned to said social media criteria.

In an embodiment, the plurality of testing procedures include automated testing and regression testing.

In one embodiment, the assigning each of the test cases to one of a plurality of groups includes re-assigning the test cases among the plurality of groups at specified times.

In an embodiment, the re-assigning the test cases includes adjusting the weights assigned to each of the criteria to obtain adjusted weights, determining new criteria scores for each of the test cases using said adjusted weights, and re-assigning the test cases among the plurality of groups based on the new criteria scores.

In one embodiment, the set of criteria includes a defined complexity of the software application.

In an embodiment, the assigning each of the test cases to one of a plurality of groups includes ranking the test cases based on the criteria scores for the test cases, and assigning each of the test cases to one of the plurality of groups based on said ranking.

In one embodiment, the ranking the test cases includes ranking the test cases based on the criteria scores to obtain a ranked list of the test cases, and a test manager removing one or more of the test cases from the ranked list.

In an embodiment, the identifying a set of criteria includes a test manager changing the criteria.

When automating test cases, teams often fail to do a proper selection due to different reasons such as lack of understanding of the application future changes, automation feasibility, late engagement in the development cycle and lack of communication with developers, among others. This directly results in excessive time invested in maintaining test scripts and ultimately in poor defect identification.

In an embodiment of the invention, criteria used to select test cases may include:
  Stakeholder needs: from a Requirements management System obtain the list of prioritized requirements;
  More used code functionality: from a Source Control Code Repository and Build System, identify the code functionality that has more dependencies;
  Code changes: from a Source Control code Repository and build System to determine which code component has had more change sets or has been changing more often;
  Code with the highest defect rate: from a Defect management System, get the number of defects per component;
  Code complexity: as measured from the developers' perspective;
  Defect Injection Rate per Developer: from the Defect Management System, get the number of defects per developer;

Time required to execute specific test cases: from a Test Management system, collect existing test execution records;

Different environments needed for testing: from the Test Management system;

Required data for execution, such as when the test case needs a pool of data: from the Test Management system;

Test case stability: from the Test Management system review test case history/version changes; and Comments from clients: sentiment analysis from a Social Media associated to product functionality.

Given the specific weight for the criteria, the System, in embodiments of the invention, provides a ranked list of test cases for automation/regression.

With respect to the above-criteria, stakeholder needs is, in embodiments of the invention, mapped to a prioritized list of requirements. This is done using Software collaborative lifecycle management tools such as IBM Rational products, which can be used to map Existing and New Test Cases vs. Requirements. This is done not only to test the requirement's functionality, but also to regression test functional existing code to guarantee the correct functionality of the existing code after the new code integration. Having the previous, the requirements priorities can be used to select candidates.

Also, code complexity can be measured in a variety of ways, for example cyclomatic complexity. It may be useful to take advantage of the developer's experience working on a particular component.

BRIEF DESCRIPTION OF THE SEVERAL VIEWS OF THE DRAWINGS

FIG. 4 is a table showing various criteria that may be used to score test cases.

FIG. 5 shows initial weights that may be give to each of the criteria listed in FIG. 4.

DETAILED DESCRIPTION

Figure 1:
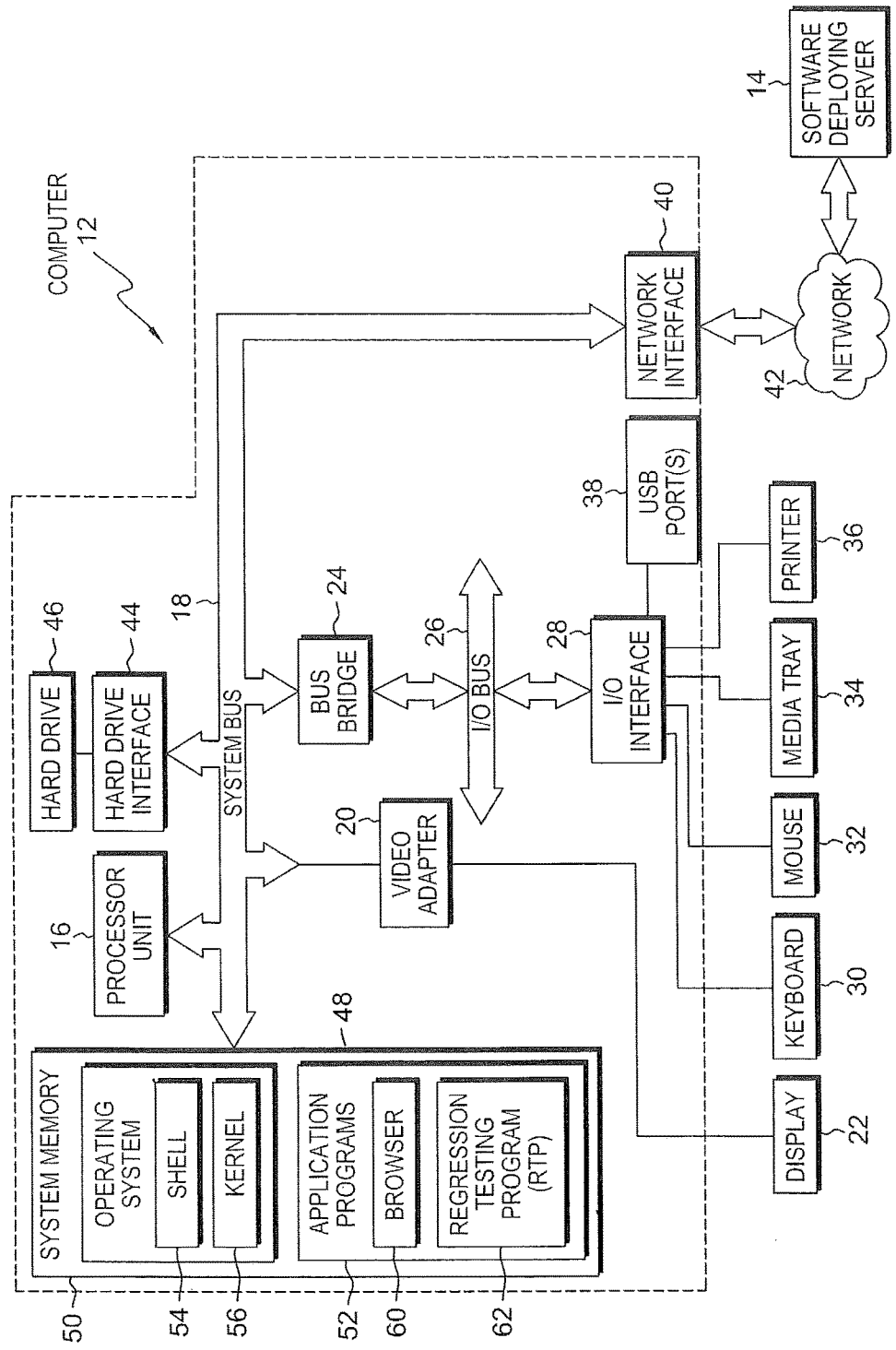
FIG. 1 depicts an exemplary computer system in which this invention may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference to FIG. 1, there is depicted a block diagram of an exemplary system and network that may be utilized by or in the implementation of the present invention. Some or all of the exemplary architecture, including both depicted hardware and software, shown for and within computer 12 may be utilized by software deploying server 14.

Exemplary computer 12 includes a processor 16 that is coupled to a system bus 18. Processor 16 may utilize one or more processors, each of which has one or more processor cores. A video adapter 20, which drives/supports a display 22, is also coupled to system bus 18. System bus 18 is coupled via a bus bridge 24 to an input/output (I/O) bus 26. An I/O interface 28 is coupled to I/O bus 26. I/O interface 28 affords communication with various I/O devices, including a keyboard 30, a mouse 32, a media tray 34 (which may include storage devices such as CD-ROM drives, multimedia interfaces, etc.), a printer 36, and external USB port(s) 38. While the format of the ports connected to I/O interface 28 may be any suitable format known to those skilled in the art of computer architecture, in one embodiment some or all of these ports are universal serial bus (USB) ports.

As depicted, computer 12 is able to communicate with a software deploying server 14, using a network interface 40 and Network 42. Network interface 40 is a hardware network interface, such as a network interface card (NIC), etc. Network 42 may be an external network such as the Internet, or an internal network such as an Ethernet or a virtual private network (VPN).

A hard drive interface 44 is also coupled to system bus 18. Hard drive interface 44 interfaces with a hard drive 46. In one embodiment, hard drive 46 populates a system memory 48, which is also coupled to system bus 18. System memory is defined as a lowest level of volatile memory in computer 12. This volatile memory includes additional higher levels of volatile memory (not shown), including, but not limited to, cache memory, registers and buffers. Data that populates system memory 48 includes operating system (OS) 50 of computer 12 and application programs 52.

OS 50 includes a shell 54, for providing transparent user access to resources such as application programs 52. Generally, shell 54 is a program that provides an interpreter and an interface between the user and the operating system. More specifically, shell 54 executes commands that are entered into a command line user interface or from a file. Thus, shell 54, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 56) for processing. While shell 54 is a text-based, line-oriented user interface, the present invention will equally well support other user interface modes, such as graphical, voice, gestural, etc.

As depicted, OS 50 also includes kernel 56, which includes lower levels of functionality for OS 50, including providing essential services required by other parts of OS 50 and application programs 52, including memory management, process and task management, disk management, and mouse and keyboard management.

Application programs 52 include a renderer, shown in exemplary manner as a browser 60. Browser 60 includes program modules and instructions enabling a world wide web (WWW) client (i.e., computer 12) to send and receive network messages to the Internet using hypertext transfer protocol (HTTP) messaging, thus enabling communication with software deploying server 14 and other computer systems.

Application programs 52 in the system memory of computer 12 (as well as software deploying the system memory of server 14) also include a regression testing program (RTP) 62. RTP 62 includes code for implementing regression testing procedures. In one embodiment, computer 12 is able to download RTP 62 from software deploying server 14, including in an on-demand basis, wherein the code in RTP 62 is not downloaded until needed for execution. In one embodiment of the present invention, software deploying server 14 performs all of the functions associated with the present invention (including execution of RTP 62), thus freeing computer 12 from having to use its own internal computing resources to execute RTP 62.

The hardware elements depicted in computer 12 are not intended to be exhaustive, but rather are representative to highlight essential components required by the present invention. For instance, computer 12 may include alternate memory storage devices such as magnetic cassettes, digital versatile disks (DVDs), Bernoulli cartridges, and the like. These and other variations are intended to be within the spirit and scope of the present invention.

To perform regression testing, computer 12, and in particular, regression testing program 62 of the computer, is utilized by testing personnel to test the software product or application under test (AUT). Computer 12 includes or is connected to a test repository that contains the test scripts that will be utilized to test the AUT. As discussed above, the test scripts are grouped into test suites.

The testing personnel utilize the Regression Testing Program 62 to select the test suite or suites that are to be executed against the AUT. The execution of the test suite may be immediately executed, or may be scheduled to run on a delayed or periodic schedule, depending on the testing requirements. As the individual test scripts included in the test suite are executed, the Regression Testing Program 62 records the test result and other execution data regarding the execution of the test script. The test result may include success or failure of the test script and the execution data may include the date the script executed, the duration of the execution, the number of code blocks or lines of code tested, etc. It will be appreciated by one of ordinary skill in the art that, for a software product comprised of numerous modules and having several versions or releases, the test repository may contain hundreds or thousands of test scripts, with test results and execution data for each script spanning several months or years of execution.

When automating test cases, teams often fail to do a proper selection due to different reasons such as lack of understanding of the application future changes, automation feasibility, late engagement in the development cycle and lack of communication with developers, among others. This directly results in excessive time invested in maintaining test scripts and ultimately in poor defect identification.

Embodiments of the invention use analytics to define an evolving set of test cases for either automation or regression testing based on certain criteria related to code quality.

This process, in embodiments of the invention, improves the return on (time) investment and/or code quality when choosing test cases for automation, and the proper test cases are selected for regression, saving execution time and increasing the probability of finding defects.

Regression Testing is a type of software testing that seeks to uncover new software bugs, in existing functional and non-functional areas of a system when enhancements, patches or configuration changes have been applied. Automation Testing is a test practice which refers to the usage of software, separate from the software under test (SUT), to automate the execution of tests and the comparison of actual outcomes with predicted outcomes.

Repetitive and necessary tasks or tasks difficult to perform manually in a formalized testing process already in place can be automated. Automation is a common practice in Regression "Testing since these test cases are frequently executed during the Software Development Life Cycle.

Figure 2:
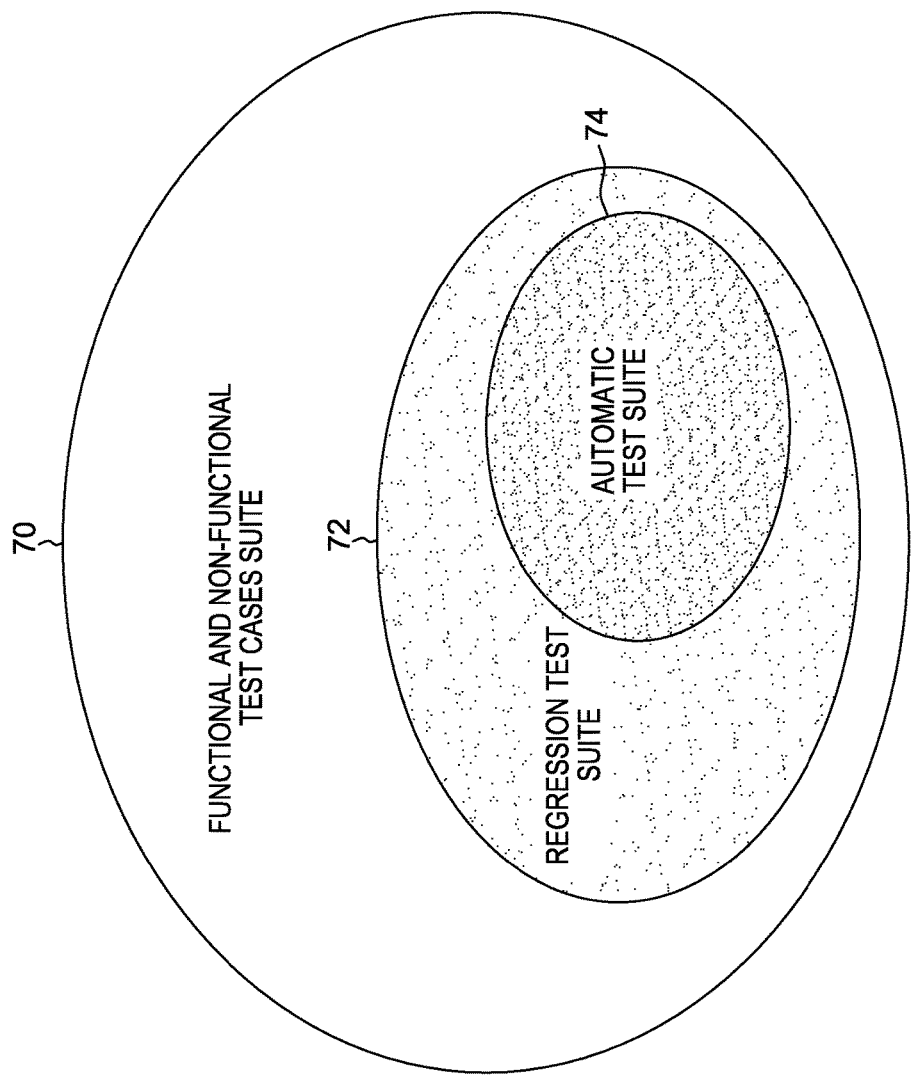
FIG. 2 diagrammatically illustrates a Regression Test Suite and, within that suite, an Automation Test Suite.

The relationship between regression and automation can be described as follows, with reference to FIG. 2. The universe of test cases either functional or non-functional for a determined release of a product is shown in the circle 70. During test execution of the universe of test case, failures will be uncovered and defects will be opened and fixed. To ensure the fixes will not affect the areas that are already working in the product, a set of test cases is selected and re-executed. These selected test cases are represented by the circle 72, and this is the set called Regression Test Suite.

From the test cases selected for Regression, there is a group of test cases that based on some criteria and best practices are good candidates to be automated. This group of test cases is represented by the circle 74.

Embodiments of this invention define a process that based on different criteria will automatically classify all the test cases inside one of the circles 72 and 74.

Embodiments of the invention can be integrated with different Test Management Tools, such as the Rational Quality Manager (RQM) from the International Business Machines Corporation. Plug-ins could also be available for other products. As will be appreciated by those of ordinary skill in the art, the applicability of this invention extends beyond the specific products identified herein, and can be implemented with similar products in the fields In an embodiment of the invention, the System will get information from different components or components systems, then assign certain weight to specific criteria, and based on that, generate a ranking for the test cases. The Test Manager will et a suggested list of the test cases for regression or automation based on this ranking, saving time and also ensuring the test cases are selected based on valid criteria. The Test Manager has the chance to establish a weight for the criteria to adapt to project needs.

Figure 3:
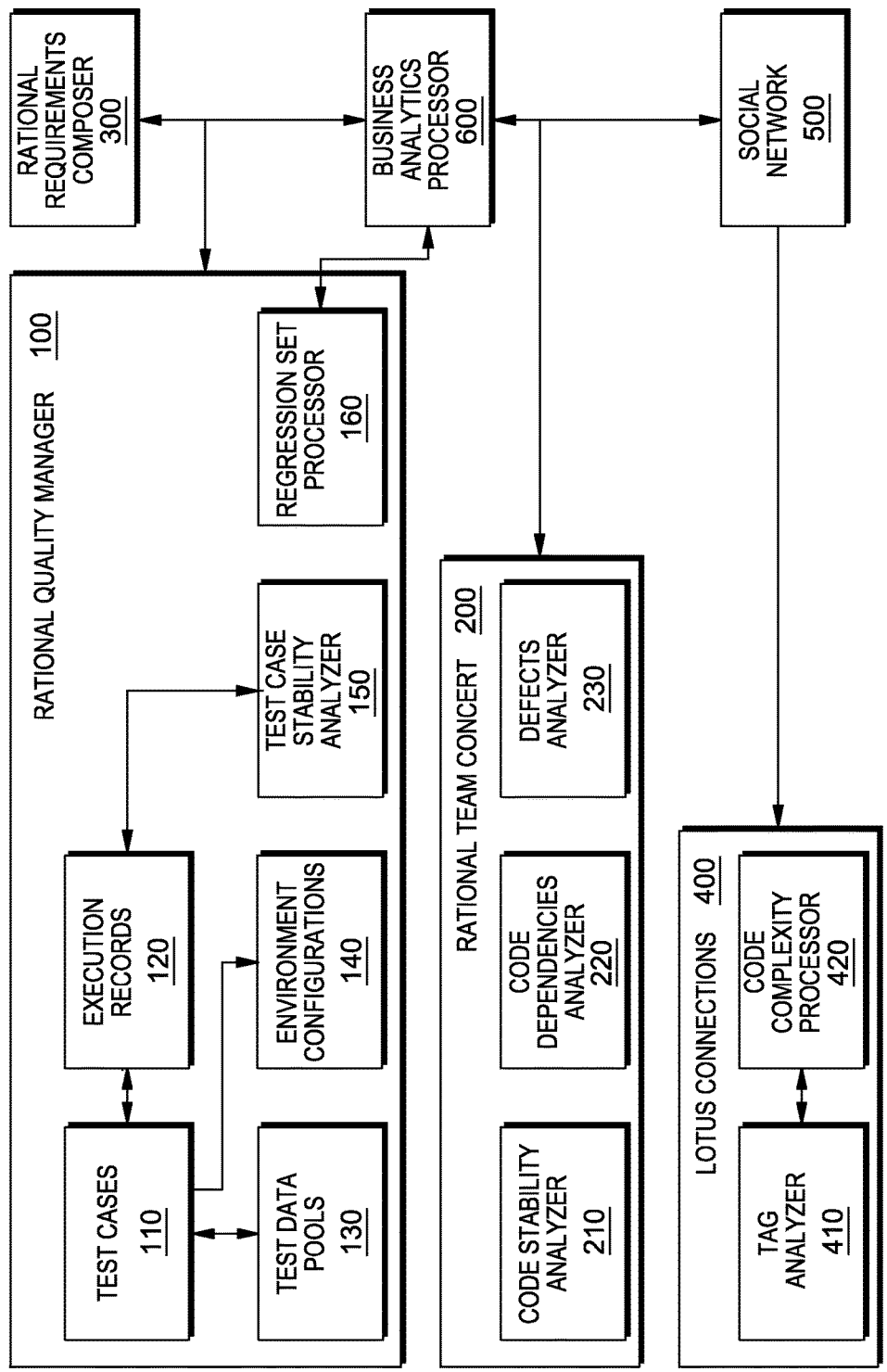
FIG. 3 shows systems and components that may be used in embodiments of the invention.

FIG. 3 illustrates components that may be used in an embodiment of this invention. FIG. 3 shows a Test Cases Management System such as IBM Rational Quality Manager 100, a Code and Defects Repository System such as IBM Rational Team concert 200, a Requirements Repository such as IBM Rational Requirements composer 300, an Internal Social Network tool such as IBM Lotus connections 400, external Social Networks 500, and a Business Analytics Processor 600. Quality Manager 100 includes Test Cases 110, Execution Records 120, Test Data Pools 130, Environment Configurations 140, Test Case Stability Analyzer 150, and Regression Set Analyzer 160. Rational Team Concert 200 includes Code Stability Analyzer 210, Code Dependencies Analyzer 220 and Defects Analyzer 230, and Lotus Connections 400 includes Tag Analyzer 410 and Code Complexity Processor 420.

Once the Test manager starts the system, the system will retrieve the list of test cases and will analyze them one by one according to, for example, the criteria listed in FIG. 4 and discussed below.

The value of the criteria may be calculated by the system based on the definitions below. Points could be set to other values.

C1—Requirement Priority

Test case should be linked to a requirement:
  High priority=3 points,
  Medium priority=2 points,
  Low priority=1 point.

C2—Core Function

Test case is linked to the components that are testing:
  Component used by more than X components or with X components depending on it at build time=3 points,
  Component used by more than Y components or with Y components depending on it at build time=2 points,
  Components used by more than Z components or with Z components depending on it at build time=1 point.

Where X, Y, Z are numbers defined by the Software Architect according to the type of project and X>Y>Z.

C3—Defect Rate per Component

Test case is linked to a component or components, system uses the component with the highest defect rate as reference:
  Component has had more than X defects found in current release=3 points,
  Component has X defects found in current release=2 points,
  Component has less than X defects found in current release=1 point.

Where X is a number defined by the Software Architect according to the type of project.

C4—Changes in Code

Test case is linked to a component or components, system uses the component with the highest changes in code as reference:

Component has had more than X changes in the current release=3 points,

Component has had X changes in the current release=2 points,

Component has less than X changes in the current release=1 point.

Where X is a number defined by the Software Architect according to the type of project.

C5—Perceived Complexity

Test case is linked to a component or components, system uses the component with the highest complexity in code as reference:

Component has developers perceived complexity as high=3 point,

Component has developers perceived complexity as medium or no established complexity=2 point Component has developers perceived complexity as low=1 point.

C6—Defect Injection Rate of Developer

Test case is linked to a component or components, system uses the component with the highest defect rate as reference:

Code created by developer with defect injection rate of more than X defects per 100 LOC=3 points, Code created by developer with defect injection rate of X defects per 100 LOC=2 points, Code created by developer with defect injection rate of less than X per 100 LOC=1 point.

Where X is a number defined by the Software Architect according to the type of project.

C7—Execution Time

Test case that requires less than X minutes=3 point.

Test case that requires X minutes to be executed=2 points.

Test case that requires more than X minutes to be executed=1 point.

Where X is a number defined by the Software Architect according to the type of project.

In some applications of the invention, depending on the System under test and project schedule, time may be not be a key factor to consider. In this case, the Execution Time Criteria can be set to lower values meaning that most time consuming test cases will be classified for automation effort based on the points in this criteria. In the case of Execution Time, the X refers to a value defined by the software architect used as a reference to determine when a test case is candidate for automation.

C8—Execution Environment

Test case is executed in less than X environments=3 points.

Test case is executed in X environments=2 points.

Test case is executed in more than X environments=1 point.

Where X is a number defined by the Software Architect according to the type of project.

C9—Test data

Test case requires less than X different sources of input data=3 points

Test case requires X different sources of input data=2 points.

Test case requires more than X different sources of input data=1 point.

Where X is a number defined by the Software Architect according to the type of project.

C10—Test Case Execution Results

Test case fails more than X % of the time it is executed=3 points.

Test case fails X % of the time it is executed=2 points.

Test case fails less than X % of the time it is executed=1 point.

Where X is a number defined by the Software Architect according to the type of project.

C11—Sentiment Analysis

Client is unhappy with the product=3 points.

Client is somewhat happy but would like product to improve=2 points.

Client is happy with the product=1 point.

Given the type of project, the Test Manager can define a specific weight (W) for each of the criteria and FIG. 5 lists weights that may be initially given to the above-criteria. For example, in a system where development is not including new functionality but is doing a major refactoring of the code, criteria C4—changes in the code—and C6—defect injection rate per developer—are more important, therefore, software architect establishes a higher value for the criteria rate and the system gets a weight of 3 in this scenario (the highest for this criteria) and classifies them for regression because the components with more changes in the code, developed by programmers with higher defect injection rate are likely to introduce bugs to the system thus the need to perform regression test.

Every criteria has an associated weight. The Criteria value (C) will be calculated for each Test Case using the System, the Weight (W) will be provided just once at the beginning of the method for all the project.

Ranking is established by the summatory of all the criteria scores.

$$\text{Test case ranking Criteria Score} = \sum_{i=1}^{11} \cdot C_i * W_i$$

According to the above-formula, the maximum value is 99 and the minimum value is 11.

A test case is a candidate for automation when the total is between 11 and X. A test case is a candidate for regression when the total is between Y and 99. A test case is not a candidate for regression or automation when the total is between X and Y. Where 11<X<Y<99.

With reference again to FIG. 3, the Test Case Stability Analyzer 150 will utilize existing information in the system to determine which test cases have been stable in a certain number of iterations. If the test case has been successful all the time, it may not be a candidate for the regression set, but it is a candidate to be automated.

With the gathered information on which functions to test, the Regression Set Processor 160 will classify the existing test cases and provide a ranked list to the Test Manager, based on a certain criteria that can be changed by the Test Manager based on priorities. The Test Manager can also unselect specific test cases from the ranked list.

The Code Stability Analyzer 210 will analyze how often the code is being changed and how. By generating a list of all the classes that have been changed, new classes or deleted classes, the system can determine if a component of the system being developed needs to be tested or can be skipped from the regression as there are only minor changes.

The Code Dependencies Analyzer 220 will create a dependencies tree to determine which is the code that is more often used, or the "core" of the system under development. This may be useful or necessary depending on the architecture that has been created and will help the system to determine which is the code that is more critical and, associated with the test cases, it will help to determine scripts that can be automated.

The Defect Analyzer 230 will analyze which components are the ones with more valid defects created/resolved in the system under development.

The Tag Analyzer 410 and Code Complexity Processor 420 form an internal social network system that provides a forum to developers so they can increase collaboration while working in a particular system. While information is being shared, developers can tag posts using a defined tagging set to identify how complex a particular method is being to them, for example if the developer is having problems to create a new class, they can go to the forum and create a question to request help, and use a specified hash tag identifying specific components in the system under development. RQM categories are mapped to RTC components which are also mapped to Lotus Connections tags. The Code Complexity Processor will then classify the complexity of the system.

In embodiments of the invention, social networks may also be considered. In any available public network, clients may make comments, favorable or unfavorable, about a certain functionality of the system. For example, a client may be posting to a social web site that they do not use product X. In embodiments of the invention, the system gathers all this information to be analyzed.

The Business Analytics Processor 600 is the core processor of the system since it will use the information of all other components to generate a list of functionality that needs to be tested based on the number of existing defects, code complexity, how much the code has been changed and which types of changes have suffered, customer opinions or changes in requirements.

With the gathered information on which functions to test, the Regression Set Processor 160 will classify the existing test cases and provide a ranked list to the Test Manager, based on a certain criteria that can be changed by the Test Manager based on priorities.

Figure 6:
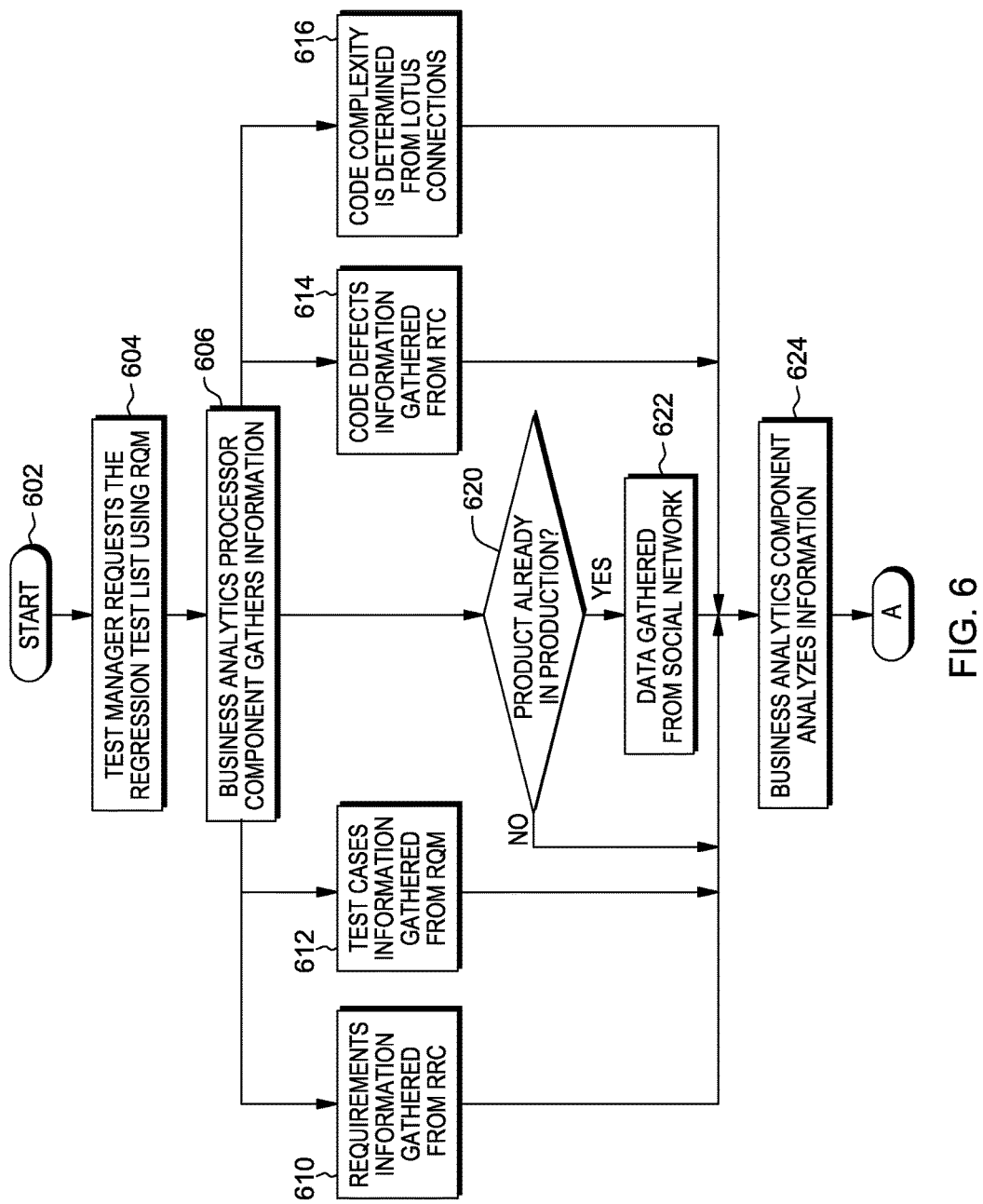
FIGS. 6 and 7 illustrate a method for implementing an embodiment of the invention.
Figure 7:
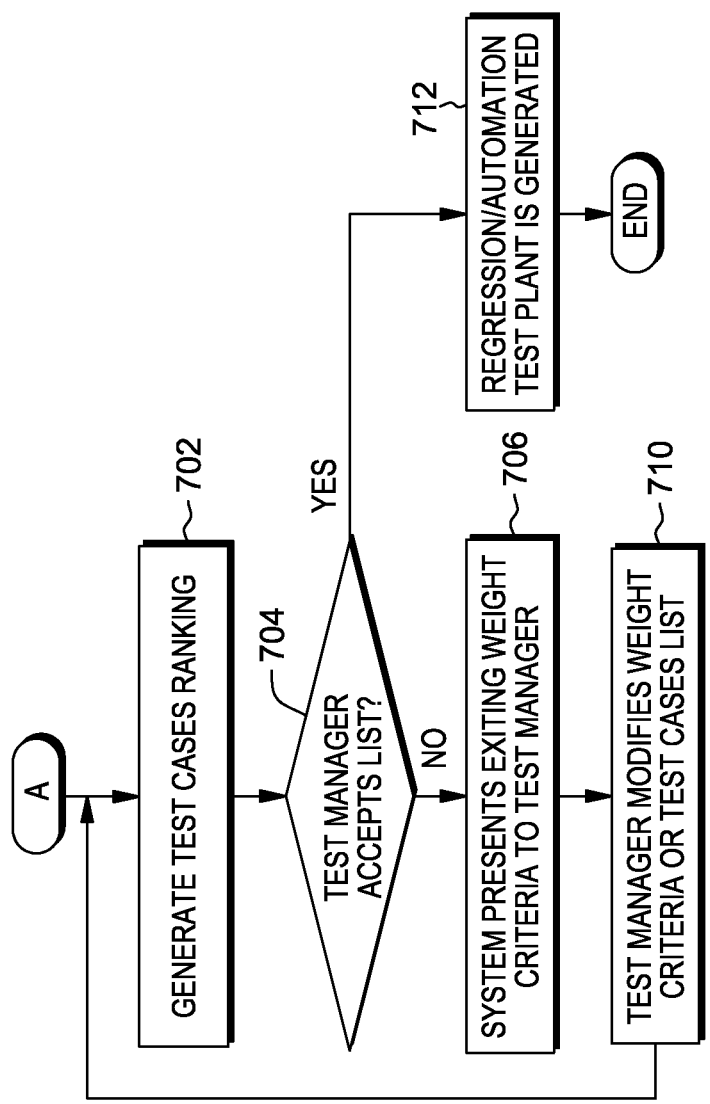

FIGS. 6 and 7 illustrate a method 600 for implementing an embodiment of the invention. At step 602, the Test Manager starts the Regression/Automation Test Plan automatic generation from the Test Management tool. At step 604, the Regression Set Processor component is called. At step 606, the Business Analytics module is called to collect the data required for the test plan selection based on the predefined criteria.

Specifically, the RRC components are called, at 610, to get the Stakeholder needs information and, at 614, to get the code stability and main functions values from the RTC. The RQM components are called, at 612, to get the TC stability, the TC usage, time metrics environments, and input data required from the RQM. At step 616, the Social Network component is triggered to get the complexity factor. Also, as represented at 620 and 622, if this is not the first time that the method is invoked for the product being tested, the social network component is called to get data about the feedback for the last release plan. At 624, data are returned for the Business Analytics components and the analysis of the results obtained is executed.

With reference to FIG. 7, at 702, the Generate Test Cases Ranking component is called. This component uses the previous data analysis from step 624 and the predefined selection priorities to generate the ranked list, and the results are presented to the user. At step 704, the user is asked if the user accepts the obtained results.

If the user does not accept the ranked list and ROI values, the system, at 706, asks the user to provide new priorities level for the predefined criteria and the method, at 710, calls the Modify Automation priorities component and returns to step 702. If, at 704, the user accepts the ranked list, the Regression/Automation Test Plan is create at 712, and the method ends.

The description of the present invention has been presented for purposes of illustration and description, but is not intended to be exhaustive or to limit the invention in the form disclosed. Many modifications and variations will be apparent to those of ordinary skill in the art without departing from the scope of the invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method of defining an evolving set of test cases for testing software applications, the method comprising:
   identifying a group of features of a given software application to be tested;
   identifying a set of criteria for the test cases, including using the identified features of the given software application to be tested as a plurality of the set of criteria for the test cases;
   assigning a value to each of the criteria based on a defined relationship of said each criteria to the given software application to be tested;
   for each of a multitude of specified test cases, assigning a weight to each of the criteria, including assigning a weight to each of the identified features of the given software application to be tested, and determining a test case score for the each test case based on the values and weights assigned to the criteria for the each test case;
   assigning each of the test cases to one of a plurality of groups based on the test case scores for the test cases, wherein each of a plurality of testing procedures is associated with one of said groups; and
   selecting one of the testing procedures to test the given software application using the group of test cases associated with the selected one of the testing procedures; and
   wherein the assigning each of the test cases to one of a plurality of groups includes re-assigning the test cases among the plurality of groups at specified times; and
   the re-assigning the test cases includes:
     adjusting the weights assigned to each of the criteria to obtain adjusted weights;
     determining new test case scores for each of the test cases using said adjusted weights; and
     re-assigning the test cases among the plurality of groups based on the new test case scores.

2. The method according to claim 1, wherein the set of criteria includes a defined social media criteria.

3. The method according to claim 2, wherein the assigning a value to each of the criteria includes:
   identifying specified comments in a defined social media platform about the software application;
   analyzing the identified specified comments; and
   using said analyzing to determine the value assigned to said social media criteria.

4. The method according to claim 1, wherein the plurality of testing procedures include automated testing and regression testing.

5. The method according to claim 1, wherein the set of criteria includes a defined complexity of the software application.

6. The method according to claim 1, wherein the assigning each of the test cases to one of a plurality of groups includes:
ranking the test cases based on the test case scores for the test cases; and
assigning each of the test cases to one of the plurality of groups based on said ranking.

7. The method according to claim 6, wherein the ranking the test cases includes:
ranking the test cases based on the test case scores to obtain a ranked list of the test cases; and
a test manager removing one or more of the test cases from the ranked list.

8. The method according to claim 1, wherein the identifying a set of criteria includes a test manager changing the criteria.

9. A system for defining an evolving set of test cases for testing software applications, the system comprising:
a business analytics processor to obtain data about a multitude of test cases and a given software application to be tested, said data including a set of criteria for the test cases, the set of criteria including an identified group of features of the given software application, to be tested a value assigned to each of the criteria based on a defined relationship of said each criteria to the given software application to be tested, and for each of the test cases, a weight assigned to each of the criteria, wherein one of said weights is assigned to each of the identified features of the given software application to be tested; and
a regression set processor for obtaining and processing data from the business analytics processor to determine a test case score for each of the multitude of test cases and to assign each of the test cases to one of a plurality of groups based on the test case scores for the test cases, wherein each of a plurality of testing procedures is associated with one of the group of test cases, and for selecting one of the plurality of testing procedures for testing the given software application using one of said group of test cases, including
for each of the multitude of test cases, assigning a value to each of the application criteria, and determining the application criteria score for the each test case based on the values assigned to the application criteria for the each test case and the weights assigned to the criteria, and
outputting a list of the test cases to a user; and wherein:
the regression set processor re-assigns the test cases among the plurality of groups at specified times, including:
adjusting the weights assigned to each of the criteria to obtain adjusted weights;
determining new test case scores for each of the test cases using said adjusted weights; and
re-assigning the test cases among the plurality of groups based on the new test case scores.

10. The system according to claim 9, wherein the regression set processor gathers information on which functions of the given software application to test, classifies the test cases, and provides a ranked list to the user.

11. The system according to claim 9, wherein the business analytics processor generates a list of functionalities of the given software application that need to be tested based on specified factors.

12. The system according to claim 9, wherein:
the given software application has a number of existing defects;
over a period of time, specified changes have been made to the software application; and
said criteria include the number of said existing defects, a defined complexity of the given software application, how much of the software application has been changed, and the types of said specified changes.

13. The system according to claim 9, further comprising:
an internal social network platform for providing a forum for comments about the given software application, said comments including defined tags to identify a measure of a complexity of the given software application; and wherein:
the internal social network platform includes a code complexity processor to analyze the defined tags and classify the complexity of the given software application.

14. An article of manufacture comprising:
at least one tangible computer readable hardware device having computer readable program code logic tangibly embodied therein to define an evolving set of test cases for testing software applications, the computer readable program code logic, when executing on a computer, performing the following:
identifying a group of features of a given software application to be tested;
identifying a set of criteria for the test cases, including using the identified features of the given software application to be tested as a plurality of the set of criteria for the test cases;
assigning a value to each of the criteria based on a defined relationship of said each criteria to the given software application to be tested;
for each of a multitude of specified test cases, assigning a weight to each of the criteria, including assigning one of said weights to each of the identified features of the given software application to be tested, and determining a test case score for the each test case based on the values assigned to the criteria for the each test case and the weights assigned to the criteria;
assigning each of the test cases to one of a plurality of groups based on the application test case scores for the test cases, wherein each of a plurality of testing procedures is associated with one of said groups; and
selecting one of the testing procedures to test the given software application using the group of test cases with which the selected one of the testing procedures is associated; and
wherein the assigning each of the test cases to one of a plurality of groups includes re-assigning the test cases among the plurality of groups at specified times; and
the re-assigning the test cases includes:
adjusting the weights assigned to each of the criteria to obtain adjusted weights;
determining new test case scores for each of the test cases using said adjusted weights; and
re-assigning the test cases among the plurality of groups based on the new test case scores.

15. The article of manufacture according to claim 14, wherein the set of criteria includes a defined social media criteria.

16. The article of manufacture according to claim 14, wherein the assigning a value to each of the criteria includes:
  identifying specified comments in a defined social media platform about the software application;
  analyzing the identified specified comments; and
  using said analyzing to determine the value assigned to said social media criteria.

17. The article of manufacture according to claim 14, wherein the plurality of testing procedures include automated testing and regression testing.

* * * * *